United States Patent [19]

Hadi et al.

[11] 4,093,697

[45] June 6, 1978

[54] PROCESS FOR RECOVERING MOLYBDENUM-99 FROM A MATRIX CONTAINING NEUTRON IRRADIATED FISSIONABLE MATERIALS AND FISSION PRODUCTS

[75] Inventors: Ali Sameh Abdel Hadi, Ettlingen-Schluttenbach; Peter-Michael Menzler; Johann Reinhardt, both of Eggenstein-Leopoldshafen, all of Germany

[73] Assignee: Gesellschaft fur Kernforschung m.b.H., Karlsruhe, Germany

[21] Appl. No.: 777,626

[22] Filed: Mar. 14, 1977

[30] Foreign Application Priority Data

Mar. 16, 1976 Germany ............................. 2610947

[51] Int. Cl.$^2$ ............................................. C01G 39/00
[52] U.S. Cl. ............................................. 423/2; 423/54
[58] Field of Search ............................. 423/2, 54, 49; 252/301.1 R; 424/1

[56] References Cited

U.S. PATENT DOCUMENTS

| 3,436,354 | 4/1969 | Gemmill et al. ............... 252/301.1 R |
| 3,745,119 | 7/1973 | Arino et al. .................... 252/301.1 R |
| 3,799,883 | 3/1974 | Arino et al. .................... 423/2 |

FOREIGN PATENT DOCUMENTS

| 453,354 | 1/1973 | U.S.S.R. ................................. 423/49 |

OTHER PUBLICATIONS

Yatirajam et al., *Analytica Chimica Acta,* 59, (#3), 381–387, (1972).
Marchetti et al., *Annali di Chimica,* (Rome) 59, 902–911 (1969).
Gorlach et al., *Ukr. Khem. Zh.,* 40 (#9), 983–985 (1974).

*Primary Examiner*—Edward A. Miller
*Attorney, Agent, or Firm*—Spencer & Kaye

[57] ABSTRACT

Process for recovering molybdenum-99 from a matrix which has been irradiated with neutrons and contains fissionable materials and fission products, wherein the matrix is decomposed in an aqueous alkali hydroxide solution and the molybdenum-99 and part of the fission products are dissolved, the solution containing the molybdenum-99 is separated from a residue of particles containing at least actinides and lanthanides and is treated with thiocyanate ions to form a molybdenum complex. In the process, the alkali solution containing molybdenum in the form of molybdate ($MoO_4^{--}$) is conditioned with an iodine reduction agent. Mineral acid is added to the alkali solution. The molybdenum contained in the acidified solution is reduced to form three-valent molybdenum Mo(III) and the Mo(III) is complexed with $SCN^-$ ions to form $[Mo(SCN)_6]^{3-}$ ions. The acid solution which contains $[Mo(SCN)_6]^{3-}$ ions and contaminants is brought into contact with previously conditioned di-sec butyl ether (organic phase). The molybdenum thiocyanate complex ions are selectively extracted from the aqueous phase into the organic phase whereby the contaminants remain practically completely in the aqueous phase. The organic phase which is now charged with the $[Mo(SCN)_6]^{3-}$ ions is separated from the molybdenum free solution. The separated organic phase is washed with diluted mineral acid in a concentration in the range from 0.001 to 0.1 Mol/l in a quantity corresponding approximately to the volume of the organic phase. The molybdenum is re-extracted with mineral acid in a concentration in the range from 5 Mol/l to 11 Mol/l from the washed organic phase into an aqueous phase.

12 Claims, No Drawings

PROCESS FOR RECOVERING MOLYBDENUM-99 FROM A MATRIX CONTAINING NEUTRON IRRADIATED FISSIONABLE MATERIALS AND FISSION PRODUCTS

BACKGROUND OF THE INVENTION

The present invention relates to a process for the recovery of molybdenum-99 from a matrix containing neutron irradiated, fissionable materials and fission products, in which the matrix is decomposed in an aqueous alkali hydroxide solution and the molybdenum-99 and part of the fission products are dissolved, the solution containing the molybdenum-99 is separated from a residue of solid particles containing at least actinides and lanthanides and is treated with thiocyanate ions in order to form a molybdenum-99 complex.

In nuclear medicine, the significance of Tc-99 is continuously at an increase as an indicator in the diagnosis of tumors. Since, however, technitium has a relatively short halflife ($T_{\frac{1}{2}} = 6.0$ h), the mother nuclide Mo-99 is eluted when required. Thus, a technitium generator is used to provide the technitium. The technitium generators generally comprise a chromatographic column having Mo-99 bearing molybdate ion absorbed thereon. Radioactive decay of the relatively, long-lived Mo-99 produces Tc-99. Elution of the chromatographic column provides an on-the-spot source of the technitium.

Previously, natural molybdenum which had been activated in reactors was used in the generators to produce the technitium. The drawbacks of this natural molybdenum material are that large columns are required for small specific activities, large injection volumes are required in order to retain the required activity, and there is a very limited availability of the generator due to the low activity.

Fission molybdenum has been found to be useful in technitium generators to produce the technitium and has been used to a greater degree in recent times. This, however, requires much refined processing technology in order to obtain the required degrees of molybdenum purity. The required radionuclide purity of the fission molybdenum for use in a technitium generator is:

$\gamma$ : I-131 $<0.05$ $\mu$C/mC Mo-99
Ru-103 $<0.05$ $\mu$C/mC Mo-99
Total $\gamma$ contamination $<0.1$ $\mu$C/mC Mo-99
$\alpha$ : no more than 1 nanocurie total
$\alpha$ activity per curie Mo-99
$\beta$ : Sr-89 $< 6 \times 10^{-4}$ $\mu$C/mC Mo-99
Sr-90 $< 6 \times 10^{-5}$ $\mu$C/mC Mo-99

A long known method for proving the presence of molybdenum where the molybdenum is present in solution as molybdate comprises reducing the molybdate with SnCl$_2$ to Mo(III), then binding the Mo(III) to SCN$^-$ ions to form a thiocyanate complex, and thereafter extracting the thiocyanate complex with the aid of diethyl ether. This method is completely useless in the recovery of Mo-99 because of the great volatility and combustibility of the diethyl ether inasmuch as the risk of a fire of explosion must be completely eliminated when working with radioactive substances.

A number of publications discuss methods which use thiocyanate ions, but these methods operate principally with the use of additional extracting agents in the organic phase, such as, for example, with tributyl phosphate (TBP) (Gorlach, V. F., Marchenko, L. M. (Kiev State University), *Ukr. Khim. Zh.;* 40: No. 9, 983-985, September, 1974 (in Russian)); or with tribenzylamine (Yatirajam, V., Ram, Jaswant (University of Kurukshetra, India), *Anal. Chim. Acta;* 59; No. 3, 381-387, May 1972); or with 2-furaldehyde (Spaccamela Marchetti, Elena, Cereti Mazza, Maria Teresa (Politecnico, Turin) *Ann. Chim.,* Rome, 59; 902-911, 1969 (in Italian)). These methods have the drawback that the additional organic extraction agents may lead to contamination of the final product which could result in behavioral malfunctions of the molybdenum on the generators. Furthermore, these contaminants may have a pyrogenic effect.

SUMMARY OF THE INVENTION

It is an object of the present invention to overcome the drawbacks of the known processes and provide a simple, easily-practiced and safe process which assures a very high yield of an extremely pure Mo-99 product.

A further object of the present invention is to provide such a process which has a minimum of process stages, such as, for example, sorption stages and elution stages, and results in a reduction of the quantity of contaminated, organic waste.

Another object of the present invention is to provide such a process which is easily handled as a matter of routine and with remote control.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims:

To achieve the foregoing objects and in accordance with its purpose, the present invention, as embodied and broadly described, provides a process for recovering molybdenum-99 from a matrix which has been irradiated with neutrons and contains fissionable materials and fission products, wherein the matrix is decomposed in an aqueous alkali hydroxide solution and the molybdenum-99 and part of the fission products are dissolved, the solution containing the molybdenum-99 is separated from a residue of particles containing at least actinides and lanthanides and is treated with thiocyanate ions to form a molybdenum complex, comprising: (a) conditioning the alkali solution containing molybdenum in the form of molybdate (MoO$_4^{--}$) with an iodine reduction agent in a quantity corresponding to a concentration range between $10^{-4}$ Mol and 0.2 Mol per liter alkali soluton; (b) adding mineral acid to the alkali solution until a hydronium ion concentration (H$_3$O$^+$ ion concentration) in the range from 0.1 to 6 Mol/l has been reached; (c) reducing the molybdenum contained in the acidified solution of step (b) to form a three-valent molybdenum Mo(III) and complexing the Mo(III) with SCN$^-$ ions to form [Mo (SCN)$_6$]$^{3-}$ ions, said SCN$^-$ ions being present in an ion concentration in the range between 0.1 Mol/l and 3 Mol/l of solution being subjected to reduction; (d) bringing the aqueous acid solution from step c) as an aqueous phase which contains [Mo (SCN)$_6$]$^{3-}$ ions and contaminants into contact with an organic phase of previously conditioned di-sec butyl ether (organic phase) and selectively extracting the molybdenum thiocyanate complex ions from the aqueous phase into the organic phase, whereby the contaminants remain practically completely in the aqueous phase; (e) separating the organic phase charged with [Mo (SCN)$_6$]$^{3-}$ ions from the molybdenum free solution; (f) washing the separated organic phase with diluted mineral acid having a concentration in the range from 0.001 to 0.1 1 Mol/l, the quantity of the diluted mineral acid approximately corresponding to the volume of the organic phase; and (g) re-extracting the molybdenum with mineral acid of a concentration in the range of from 5 Mol/l to 11Mol/l from the washed organic phase into an aqueous phase.

In one embodiment of the present invention, the reduction to form the Mo(III) ions and the complexing of the Mo(III) ions is effected by mixing the acidified solution from step b) with an aqueous thiocyanate ion solution containing metallic zinc or metallic aluminum to form a solution which contains the metallic zinc or aluminum in a concentration range between 10 mg/l and 2000 mg/l and a concentration of thiocyanate ions in the range between 0.1 Mol/l and 3 Mol/l of solution; and reducing the molybdenum contained in the acidified solution of step (b) with the aid of the hydrogen produced from a reaction between the hydronium ions and the metallic zinc or the metallic aluminum to form the three-valent molybdenum Mo(III) which then complexes with the $SCN^-$ ions to form $[Mo(SCN)_6]^{3-}$ ions.

In another embodiment of the present invention, the reduction to form the Mo(III) ions and the subsequent complexing is effected by initially subjecting the acidified solution from step b) to a cathodic reduction whereby the molybdenum is reduced to molybdenum (III), and bringing the resulting Mo(III) into contact with thiocyanate ions to form complexes, the concentration of the thiocyanate ions in the solution being subjected to the cathode reduction being in the range between 0.1 Mol/l and 3 Mol/l.

It is to be understood that both the foregoing general description and the following detailed description are exemplary, but are not restrictive of the invention.

DETAILED DESCRIPTION OF THE INVENTION

In the process of the present invention, an alkali solution which contains molybdenum as molybdate ($MoO_4^{--}$) is treated. This alkali solution generally is one which is formed during the recovery of Mo-99 from targets which have been subjected to an enrichment process. Customarily, Mo-99 is recovered and isolated from plates or cylinders in the form of uranium-aluminum targets which have been enriched with uranium-235. In order to realize a high Mo-99 yield or fission rate with the same quantity of uranium, the target material contains about 93% of enriched uranium-235.

In view of the short cooling periods for the target to be processed, iodine isotopes, such as I-131, I-132 and I-133, are very much involved in the iodine emission rate. In order to assure that this emission rate is reduced to values below those set by safety councils, agencies and laws of various countries, the uranium-aluminum targets are decomposed in an alkali solution and iodine reduction agents are added so that elemental iodine is converted to iodide ions. Thus, and due to the avoidance of the presence of $NO_3^-$ or $NO_2^-$ ions in the process according to the present invention, the possible danger of fire in the activated carbon filter beds being used to retard the fission gases Xenon-A33 and A35, is prevented.

If a U/Al alloy containing uranium which has been enriched to 93% is selected to produce Mo-99, the yield from a U/Al sample, for example, containing 1 g U-235 without consideration of the flux depression of the sample, and with a neutron flux of $5 \cdot 10^{13}$ cm$^{-2}$sec$^{-1}$, after a period of irradiation and a period of cooling and a period of processing of three days each, is 30 C Mo-99.

It is also possible, however, to subject other matrices containing uranium as the fissionable material or other fissionable materials, respectively, to neutron irradiation in order to produce Mo-99.

For an alkali decomposition, the matrix is treated with sodium liquor at about 120° C. Thus, the aluminum and the fission products molybdenum, tellurium and iodine, as well as the alkali and earth alkali metals are quantitatively dissolved. Part of the resulting fission products zirconium and ruthenium are also dissolved, while the lanthanides and actinides as well as the major portion of Ru and Zr remain undissolved in the form of mud.

After filtering the mud, the alkali solution is used as the starting solution to obtain a highly pure molybdenum-99 according to the process of the invention.

In the practice of the present invention, the starting alkali solution is conditioned with an iodine reduction agent. Exemplary of suitable iodine reduction agents are sulfite ions in aqueous solution, such as, for example, sodium sulfite or potassium sulfite. In addition, hydroxyl ammonium sulfate or hydrazine sulfate can be used as iodine reduction agents. The iodine reduction agent generally is used in a quantity corresponding to a concentration range between $10^{-4}$ Mol and 0.2 Mol per liter of alkali solution. In order to condition the alkali starting solution with $Na_2SO_3$ as the iodine reduction agent, it is sufficient, for example, to have a sulfite concentration in the alkali solution of 0.1 Mol to 0.05 Mol per liter.

In the practice of the present invention, a mineral acid is added to the alkali solution until a hydronium ion concentration ($H_3O^+$ ion concentration) in the range between 0.1 and 6 Mol/l has been reached. The mineral acid which is added to the alkali solution advantageously can be hydrochloric acid or sulfuric acid. The acid concentration after addition of the acid preferably can be, for example, in the range from 0.5 to 3 Mol/l.

In the practice of the present invention, the molybdenum contained in the alkali solution is reduced to form a three-valent molybdenum Mo(III) and the Mo(III) is complexed with $SCN^-$ ions to form $[Mo(SCN)_6]^{-3}$ ions. The valency of the Mo$^{+++}$ formed by the reduction is thus stabilized by the creation of the stable thiocyanate complex $[Mo(SCN)_6]^{-3}$. This reduction and complexing can be performed in either of two techniques.

In the first reduction and complexing technique, an aqueous thiocyanate-containing solution is added to the alkali solution to form a conditioned alkali solution which contains mineral acid and thiocyanate ions. The thiocyanate ion containing solution which is added to the alkali solution can be a solution based on $NH_4SCN$, NaSCN or KSCN or mixtures of these thiocyanate ion forming compounds. In addition to containing these thiocyanate ion forming compounds, the thiocyanate solution which is added to the alkali solution contains metallic zinc or metallic aluminum. The solution which is formed upon addition of the thiocyanate containing solution to the alkali solution contains the metallic zinc or aluminum in a concentration range between 10 mg/l and 2000 mg/l and a concentration of thiocyanate ions in the range between 0.1 Mol/l and 3 Mol/l. The thiocyanate concentration sufficient for complex formation generally is about 1 to 2 Mol/l of solution. In the presence of larger quantities of aluminum or foreign cations, phase, the 0.1-molar hydrochloric acid used as the wash solution contained $7.95 \times 10^3$ pulses per minute which is equal to 7.1% so that before re-extraction $1.01 \times 10^5$ pulses per minute, which is equal to 90.5% of the initial molybdenum, could be detected in the organic phase. After re-extraction of the Mo from the organic phase into an aqueous phase, the organic phase had only 201 pulses per minute which is equal to 0.18% Mo, so that a yield of molybdenum corresponding to $1.008 \times 10^5$ pulses per minute, i.e. a total of 90% of the originally present molybdenum, could be obtained in the 10 ml of 11-molar hydrochloric acid used for the re-extraction.

EXAMPLE 2

The procedure of Example 1 was repeated and the chemical conditions were substantially the same as in Example 1. The only variations were with respect to addition of the active molybdenum which contained $1.67 \times 10^5$ pulses per minute, and this pulse rate was equated with 100%. Mo losses in the aqueous phase after extraction were $3.16 \times 10^3$ pulses per minute which is equal to 1.89%. After washing of the organic phase, the wash solution contained $1.34 \times 10^4$ pulses per minute which is equal to an 8.0% molybdenum loss to the wash solution. After washing, the organic phase contained $1.5 \times 10^5$ pulses per minute which is equal to 89.9%. After re-extraction of the Mo from the organic phase into the aqueous phase, the organic phase contained 170 pulses per minute which is equal to 0.1% Mo. The yield in this case corresponded to $1.49 \times 10^5$ pulses per minute which is equal to 89.2% of the originally present molybdenum or 99.33% of the extracted activity after washing. The few tenths of a percent of discrepancies presumably are the result of minor adsorption losses at the glass walls of the apparatus.

EXAMPLE 3

In this example, the molybdenum extraction was conducted in the presence of aluminum. The procedure of Example 1 was used and the chemical conditions from Example 1 were changed only to the extent that the aqueous phase contained 0.25 to 0.5 Mol/l Al and therefore the $SCN^-$ ion concentration was increased to 2 Mol/l. The extraction efficiency became only slightly worse.

In a first experiment, the aqueous phase before extraction contained $1.15 \times 10^5$ pulses/minute and this pulse rate was equated with 100%. The Mo losses in the aqueous phase after extraction were $1.36 \times 10^4$ pulses/minute which is equal to 11.83%.

In a second experiment, the aqueous phase before extraction contained $1.02 \times 10^5$ pulses/minute and this pulse rate was equated with 100%. The Mo losses in the aqueous phase after extraction were $9.79 \times 10^3$ pulses/minute which is equal to 9.6%.

The results of these experiments show that the extraction yield in the presence of 0.25 to 0.5 M/l aluminum lies at approximately 89%. The re-extraction after washing produces a yield of approximately 81% of the starting activity.

The decontamination factors determined in further experiments for various fission products were $1 \times 10^5$ for Cs-137; $1 \times 10^5$ for Ru-106; $2 \times 10^4$ for I-131; $1 \times 10^5$ for Ba-140; and $1 \times 10^5$ for La-140.

It will be understood that the above description of the present invention is susceptible to various modifications, changes and adaptations, and the same are intended to be comprehended within the meaning and range of equivalents of the appended claims.

What is claimed is:

1. Process for recovering molybdenum-99 from a matrix which has been irradiated with neutrons and contains fissionable materials and fission products, wherein the matrix is decomposed in an aqueous alkali hydroxide solution and the molybdenum-99 and part of the fission products are dissolved, the solution containing the molybdenum-99 is separated from a residue of particles containing at least actinides and lanthanides and is treated with thiocyanate ions to form a molybdenum complex comprising the steps of:
   (a) conditioning the alkali solution containing molybdenum in the form of molybdate ($MoO_4^{--}$) with an iodine reduction agent in a quantity corresponding to a concentration range between $10^{-4}$ Mol and 0.2 Mol per liter alkali solution;
   (b) adding mineral acid to the alkali solution until a hydronium ion concentration in the range from 0.1 to 6 Mol/l has been reached.
   (c) reducing the molybdenum contained in the acidified solution of step b) to form a three-valent molybdenum Mo(III) and complexing the Mo(III) with $SCN^-$ ions to form $[Mo(SCN)_6]^{3-}$ ions, said $SCN^-$ ions being present in an ion concentration in the range between 0.1 Mol/l and 3 Mol/l of the solution being subjected to the reduction;
   (d) bringing the aqueous acid solution from step c) as an aqueous phase which contains $[Mo(SCN)_6]^{3-}$ ions and contaminants into contact with an organic phase of previously conditioned di-sec butyl ether and selectively extracting the molybdenum thiocyanate complex ions from the aqueous phase into the organic phase, whereby the contaminants remain practically completely in the aqueous phase;
   (e) separating the organic phase charged with $[Mo(SCN)_6]^{3-}$ ions from the molybdenum free solution;
   (f) washing the separated organic phase with diluted mineral acid having a concentration in the range from 0.001 to 0.1 Mol/l in a quantity approximately corresponding to the volume of the organic phase;
   (g) re-extracting the molybdenum with mineral acid of a concentration in the range from 5 Mol/l to 11 Mol/l from the separated and washed organic phase into an aqueous phase.

2. Process as defined in claim 1 wherein the reduction to form the Mo(III) ions and the complexing of the Mo(III) ions is effected by mixing the acidified solution from step (b) with an aqueous thiocyanate ion solution containing metallic zinc or metallic aluminum, to form a solution which contains the metallic zinc or aluminum in a concentration range between 10 mg/l and 2000 mg/l and a concentration of thiocyanate ions in the range between 0.1 Mol/l and 3 Mol/l, and reducing the molybdenum contained in the acidified solution of step (b) with the aid of the hydrogen produced from a reaction between the hydronium ions and the metallic zinc or the metallic aluminum to form the three-valent molybdenum Mo(III) which then complexes with the $SCN^-$ ions to form $[Mo(SCN)_6]^{3-}$ ions.

3. Process as defined in claim 1 wherein the reduction to form the Mo(III) ions and the subsequent complexing is effected by initially subjecting the acidified solution from step b) to a cathodic reduction whereby the molybdenum is reduced to molybdenum (III), and bringing the resulting Mo(III) into contact with thiocyanate ions to form complexes, the concentration of the thiocyanate respectively, the thiocyanate concentration may possibly have to be increased to 3 Mol/l.

The molybdenum in this conditioned acidified, and thiocyanate-containing solution is reduced with the aid of the hydrogen produced from a reaction between the hydronium ions and the metallic zinc or the metallic aluminum to form a three-valent molybdenum Mo(III). The Mo(III) is then complexed with the $SCN^-$ ions in the solution to form $[Mo(SCN)_6]^{-3}$ ions.

The conditioning and acidification of the alkali solution and addition of the thiocyanate solution to the alkali solution can take place in the sequence of firstly conditioning, secondly acidifying, and thirdly adding the thiocyanate solution. The conditioning, acidification and addition of the thiocyanate solution, however, need not necessarily take place in the above sequence, and can be effected in a different sequence such as adding $SCN^-$ in the alkali solution and subsequent acidifying.

In the second technique for reducing and complexing the molybdenum in the alkali solution, the molybdenum is reduced by a cathode reduction. In this technique, a conditioned and acidified alkali solution is initially subjected to a cathodic reduction to reduce the molybdenum to Mo(III). The resulting Mo(III) is brought into contact with thiocyanate ions to form the $[Mo(SCN)_6]^{-3}$ complexes. The concentration of the thiocyanate ions in the acidified alkali solution to effect this complexing is in the range between 0.1 Mol/l and 3 Mol/l. To achieve the desired thiocyanate ion concentration in the alkali solution, a thiocyanate containing solution based on $NH_4SCN$, $NaSCN$, or $KSCN$ or mixtures thereof can be added to the alkali solution. As in the first technique, the various additions to the alkali solution can be in the sequence of conditioning, acidification and addition of thiocyanate containing solution, but other sequences can be employed.

The cathodic reduction of the molybdate to Mo(III) results in the great advantage that no further quantities of ions which would increase the proportion of solids in the solution and thus the waste volume are introduced into the solution and that a lower concentration of thiocyanate ions is required.

In the practice of the present invention, the aqueous acid solution which contains the $[Mo (SCN)_6]^{3-}$ ions and contaminants is brought into contact with an organic phase of previously conditioned di-sec butyl ether and the molybdenum thiocyanate complex ions are selectively extracted from the aqueous phase into the organic phase, whereby the contaminants remain practically completely in the aqueous phase.

The $[Mo (SCN)_6]^{3-}$ complex is selectively extracted by the pretreated or conditioned di-sec butyl ether and is almost quantitatively extracted already in this extraction stage. During this extraction step, all fission products considered to be contaminants in the production of Mo-99 and other constituents of the treated solution which is being extracted remain in the aqueous phase.

Conditioning of the di-sec butyl ether before it is used in the extraction step is effected by treating the ether with a reduction agent. The reduction agent is one which reduces iodine and peroxide, such as, for example, $SO_2$ in gaseous form, an aqueous solution of $H_2SO_3$ or an aqueous solution of sulfite ions e.g. a concentration of $SO_3^{--}$ in the range of 0.001 to 0.1M. The best reduction agent for this purpose has been found to be sulfurous acid. In addition to a very rapid reduction of the peroxides present it also has the advantage that no chemicals foreign to the process come into contact with the ether.

The extraction yield with di-sec butyl ether in a single-stage extraction process with identical volumes of organic and aqueous phase is approximately 90%. The receptivity of the above mentioned ether for molybdenum is approximately 10 mg/l. The boiling point of di-sec butyl ether lies at 119° C. There is no danger of fire or of an ether explosion when this ether is employed.

Aside from diethyl ether, the higher ethers as well as the lower ethers are unsuitable. These ethers discolor quickly and their Mo extraction capability is hardly noticeable.

A particular advantage of the process is that almost no contaminants can be found any longer in the extracted Mo-99.

The extraction of the acid solution containing the $[Mo (SCN)_6]^{3-}$ ions charges the organic phase with the $[Mo (SCN)_6]^{3-}$ ions and the charged organic phase is then separated from the molybdenum-free solution.

The separated organic phase is then washed with diluted mineral acid having a concentration in the range from 0.001 to 0.1 Mol/l in a quantity approximately corresponding to the volume of the organic phase. The diluted mineral acid used for this washing can be hydrochloric acid or sulfuric acid and can be, for example, 0.01 M hydrochloric acid or 0.01 M sulfuric acid.

After washing, the molybdenum is re-extracted with mineral acid of a concentration in the range from 5 Mol/l to 11 Mol/l from the organic phase into an aqueous phase. Re-extraction of the molybdenum into an aqueous phase preferably is effected with hydrochloric acid or sulfuric acid as the mineral acid in a quantity which lies in the range of about one quarter of the volume of the organic phase to the entire volume of the organic phase. Re-extraction of molybdenum from the organic ether can be effected after one-time washing with 0.1 M/l HCl in a single stage with, for example, 11 molar hydrochloric acid in an amount of one-fifth of the ether volume.

The present invention will be explained below with the aid of a few examples which, however, in no way limit the invention.

EXAMPLE 1

In order to extract molybdenum from an aqueous phase to an organic phase, 50 ml of 3-molar hydrochloric acid which was 1-molar $SCN^-$ ions and contained 0.5 mg inactive molybdenum (corresponding to 10 mg Mo/l ether) was brought into contact with 50 ml di-sec butyl ether which had previously been shaken out with 0.5 ml of an aqueous $H_2SO_3$ solution. After extraction of the $[MO (SCN)_6]^{3-}$ complex, the organic phase was washed with 50 ml of 0.1-molar hydrochloric acid. After washing, a re-extraction of the molybdenum into an aqueous phase was effected with 10 ml of 11-molar hydrochloric acid.

Mo-99 was added to the inactive molybdenum before the extraction stage in a quantity of $1.12 \times 10^5$ pulses/minute. In the calculation of the efficiency of the process of the present invention from the extraction step to the re-extraction step, this pulse rate was equated with 100%. After extracting with the organic phase, the remaining aqueous phase contained the contaminants and a small proportion of the total content of molybdenum with a pulse rate of $2.19 \times 10^3$ pulses per minute which is equal to 1.95%. After washing of the organic ions in the solution subjected to the cathode reduction being in the range between 0.1 Mol/l and 3 Mol/l.

4. Process as defined in claim 1 wherein sulfite ions in aqueous solution are used as the iodine reduction agent.

5. Process as defined in claim 4 wherein the sulfite ions are supplied by sodium sulfite, potassium sulfite or a mixture thereof.

6. Process as defined in claim 1 wherein hydroxyl ammonium sulfate is used as the iodine reduction agent.

7. Process as defined in claim 1 wherein hydrazine sulfate is used as the iodine reduction agent.

8. Process as defined in claim 1 wherein hydrochloric acid or sulfuric acid are employed for the addition of mineral acid in step (b) and for the wash solution in step (f).

9. Process as defined in claim 1 wherein a solution of $NH_4SCN$, $NaSCN$, $KSCN$ or a mixture thereof is used to provide the thiocyanate ions for step (c).

10. Process as defined in claim 1 wherein the conditioning of the di-sec butyl ether before its use in step (d) is effected with an agent which reduces iodine and peroxides.

11. Process as defined in claim 10 wherein the agent which reduces iodine and peroxides is $SO_2$ in gaseous form, an aqueous solution of $H_2SO_3$, or an aqueous solution of sulfite ions.

12. Process as defined in claim 1 wherein the mineral acid employed for the re-extraction is hydrochloric acid or sulfuric acid, in a quantity which lies in the range from about one-fourth of the volume of the organic phase to the entire volume of the organic phase.

* * * * *